United States Patent [19]
Chasek

[11] Patent Number: 5,809,480
[45] Date of Patent: Sep. 15, 1998

[54] AUTOMATED, SECURE INTER AUTHORITY SETTLEMENT METHOD AND SYSTEM FOR ELECTRONIC TOLL COLLECTION

[76] Inventor: Norman E. Chasek, 24 Briar Brae Rd., Stamford, Conn. 06903

[21] Appl. No.: 113,194

[22] Filed: Aug. 30, 1993

[51] Int. Cl.[6] .................................................. G06F 163/00
[52] U.S. Cl. .............................. 705/13; 705/39; 705/40; 705/41; 705/42; 705/30; 705/44
[58] Field of Search .................................. 364/400, 401, 364/402, 403, 405, 408, 409; 340/928; 235/379, 384, 382; 705/13, 39, 40, 41, 42, 44, 30

[56] References Cited

U.S. PATENT DOCUMENTS

| | | | |
|---|---|---|---|
| 3,602,881 | 8/1971 | Bayne | 340/928 |
| 3,705,976 | 12/1972 | Platzman | 235/384 |
| 3,794,966 | 2/1974 | Platzman | 340/928 |
| 4,270,042 | 5/1981 | Case | 235/379 |
| 4,303,904 | 12/1981 | Chasek | 235/384 |
| 4,338,587 | 7/1982 | Chiapetti | 340/928 |
| 4,501,958 | 2/1985 | Glize et al. | 235/382 |
| 4,558,176 | 12/1985 | Arnold et al. | 380/4 |
| 4,675,824 | 6/1987 | Kiyama et al. | 364/464.01 |
| 4,727,243 | 2/1988 | Savar | 253/379 |
| 4,802,220 | 1/1989 | Marker, Jr. | 380/33 |
| 4,823,264 | 4/1989 | Deming | 364/408 |
| 5,086,389 | 2/1992 | Hassett et al. | 364/401 |
| 5,144,553 | 9/1992 | Hassett et al. | 364/401 |
| 5,253,162 | 10/1993 | Hassett et al. | 364/405 |
| 5,265,007 | 11/1993 | Barnhard, Jr. et al. | 364/408 |

*Primary Examiner*—Gail O. Hayes
*Assistant Examiner*—Joseph Thomas

[57] ABSTRACT

Electronic toll collection will eventually become standardized on the nation's toll roads making possible non-stop toll payments to many different toll Authorities from a single in-vehicle-device. Such a development should go hand-in-hand with electronic inter Authority settlements from prepaid accounts held by any one Authority, paying any other Authority for a vehicle's use of its facilities. This invention describes a method, and a system, that conducts automated, inter Authority settlements from prepaid accounts in a manner suited to a large number of participating, autonomous Authorities also including the ability to detect and pinpoint fraud affecting each Authority's cash flow anywhere in the greater system.

6 Claims, 2 Drawing Sheets

AUTOMATED, SECURE INTER AUTHORITY SETTLEMENT METHOD AND SYSTEM FOR ELECTRONIC TOLL COLLECTION

BACKGROUND FOR THE INVENTION

Electronic toll collection is developing along the interconnected North American toll road system. Eventually a standard toll collection approach will evolve that allows in-vehicle-devices to transact toll payments with any toll facility, while permiting automated inter Authority settlements to take place between accounts held by one Authority and the Authority whose facility has been used, while allowing each Authority to keep control on the integrity of its cash flow.

Toll collections on road systems are typically conducted by autonomous Authorities. Toll Authorities are operations sanctioned by a state or city. They are bound by regulations imposed on them, often by state law, ie. some states forbid Authorities to transfer the responsibility for their cash flow to third parties. This restriction imposes a complication onto any straightfoward, third party, inter Authority toll settlement process. Authorities are also particularly sensitive to fraud, theft, as well as to efficient cash management. They prefer cash payment, prepaid coupons or tokens. In some cases they permit credit be extended to high volume users. Tolls are now collected and processed manually. Several electronic toll collection techniques are in use. As they proliferate, the need to execute inter Authority settlements for tolls due one Authority but prepaid to another will become real. A secure settlement process can become complex when conducted among many independent Authorities operating with various state imposed restrictions.

There are two basic techniques now used for electronic toll collection. One is referred to as read-only in that it electronically transfers permanent identification data from the in-vehicle-terminal, or IVT, and debits a prepaid account held by the prepaid Authority. The second is read-write which transfers permanent identification data while storing and debiting a prepaid current account maintained within the IVT. This settlement system is applicable to either or both techniques.

SUMMARY OF THE INVENTION

The Inter Authority Settlement System, or IASS, involves In-Vehicle-Terminals, IVTs, Toll Collection Terminals, TCTs, Prepay Terminals, and Processing Centers. All of these are needed to support electronic toll collection whether it be for a single authority or involve a 100 autonomous Authorities. In IASS the in-vehicle terminal(IVT) reads out a payer Authority's identification number, to whom funds have been prepaid, in addition to the user's personal or vehicle identification number, which will be referred to as PIN. The toll collection terminal (TCT), during a transaction, inserts the payee Authority's identification number, IDN, to whom the toll must be paid. The payer and payee Authority's IDNs are combined in the TCT to create an m/n address. The m/n address designates the authority to whom funds have been prepaid by m, and the authority to whom the toll is paid by n. The m/n address is used to direct each Toll Transaction Message, TTM, to its designated data storage bin located at the Authority's processing center, TTMs consist, at a minimum, of the m/n address, a PIN, and the toll amount.

Each processing center shown in the illustrated three Authority system has three data bins. The bins in Center #1 are identified as 1/1, 2/1, and 3/1. Center #2 would have bins 1/2, 2/2, and 3/2 and Center #3 would have bins 1/3, 2/3 and 3/3. A 100 Authority system would have 100 bins.

Once per day, or so, during pre determined time slots, Center #1 transmits its toll transaction messages designated with 2/1 to Center #2 and those designated 3/1 to Center #3. The messages designated by 1/1 are retained in Center #1. Center #2 similarly transmits its transaction messages with 1/2 designators to Center #1 and 3/2 to Center #3. This is followed by Center #3 transmitting all its messages, ie. 1/3 going to Center #1 and 2/3 going to center #2. An assigned time switch actuates the transaction message readout from each m/n bin and automatic dialing to the destination for each batch. For less active m/n bins, the AT switch could be programmed to skip one or more days between transmission periods so as to allow more transactions to build up.

A synchronized assigned time switch at the receive end directs each oncoming like-m batch onto predesignated n buslines where the toll amount is extracted from each TTM. These extracted toll amounts are then summed, with each running sum being periodically transmitted to the Authority's bank by an electronic cheque. The cheques for each busline debit the running sum amount at the time of readout from the prepaid Authority's prepaid bank account and credit it to the collecting Authority's operating account. The banking system's electronic fund transferring machinery is used to execute the actual fund transfers. For example, the bus line designated 1/2 in processing center #1 debits the prepaid account of Authority #2 by its running sum and credits the Authority #1 operating account by the same amount. This process continues until all busline accounts are settled.

A complete system ideally includes prepay terminals which accept cash or its equivalent that is credited to the IVT, to the Authority's PrePay bank account, and to an individual account reconciliator. The Individual Account Reconciliator, or IAR, is a processer that has an assigned line for each prepaid account held by the Authority. Each IAR line includes prepaid amounts; running sums of the transactions for each account; and the current balance lifted from each IVT. The prepaid amount, with transactions subtracted from it is compared with the IVT balance. If the difference is not within acceptable limits, that IVT is placed on watch. The IVT running account comparison is applicable only to read-write IVTs.

A Transaction Authenticator or TA, if used, spots and localizes counterfeit IVTs and fraudulent or erroneous activities in any part of the greater system. The TA is comprised of four parts:

The first part is typically a flash memory flip flop counter inserted in the IVT which advances one numerical step after each transaction. The number so generated is inserted in the toll transaction message.

The second part is a calendar-clock located in each TCT. This clock continuously generates time related numbers that contain the year, month, date, and time of day. For example 1:15 PM on Jun. 25, 1993 becomes 1993 6 25 1315. This number is inserted into the transaction message for toll transactions consumated during that minute.

The third part sorts out transaction messages with the same PIN, batches them, and then re-lists the batched messages in sequential order according to their transaction number assignment. This process might store a week's worth of data so as to accumulate a number of transactions for any PIN.

The fourth part has a running subtraction processer taking the difference between each sequentially listed transaction calendar-clock number in each PIN batch. A normally progressing number stream would produce only positive differences while any suspect transaction would include some negative differences and would be marked for investigation. PIN and TCT tags help pinpoint the discrepancy.

This Authentication method, easily adapted into read-write IVTs, could also be made applicable to read-only IVTs.

The various aspects and advantages of this invention will be more fully understood from a consideration of the following detailed description in conjunction with the accompanying drawings, in which.

DETAILED DESCRIPTION OF THE INVENTION

Figure 1:
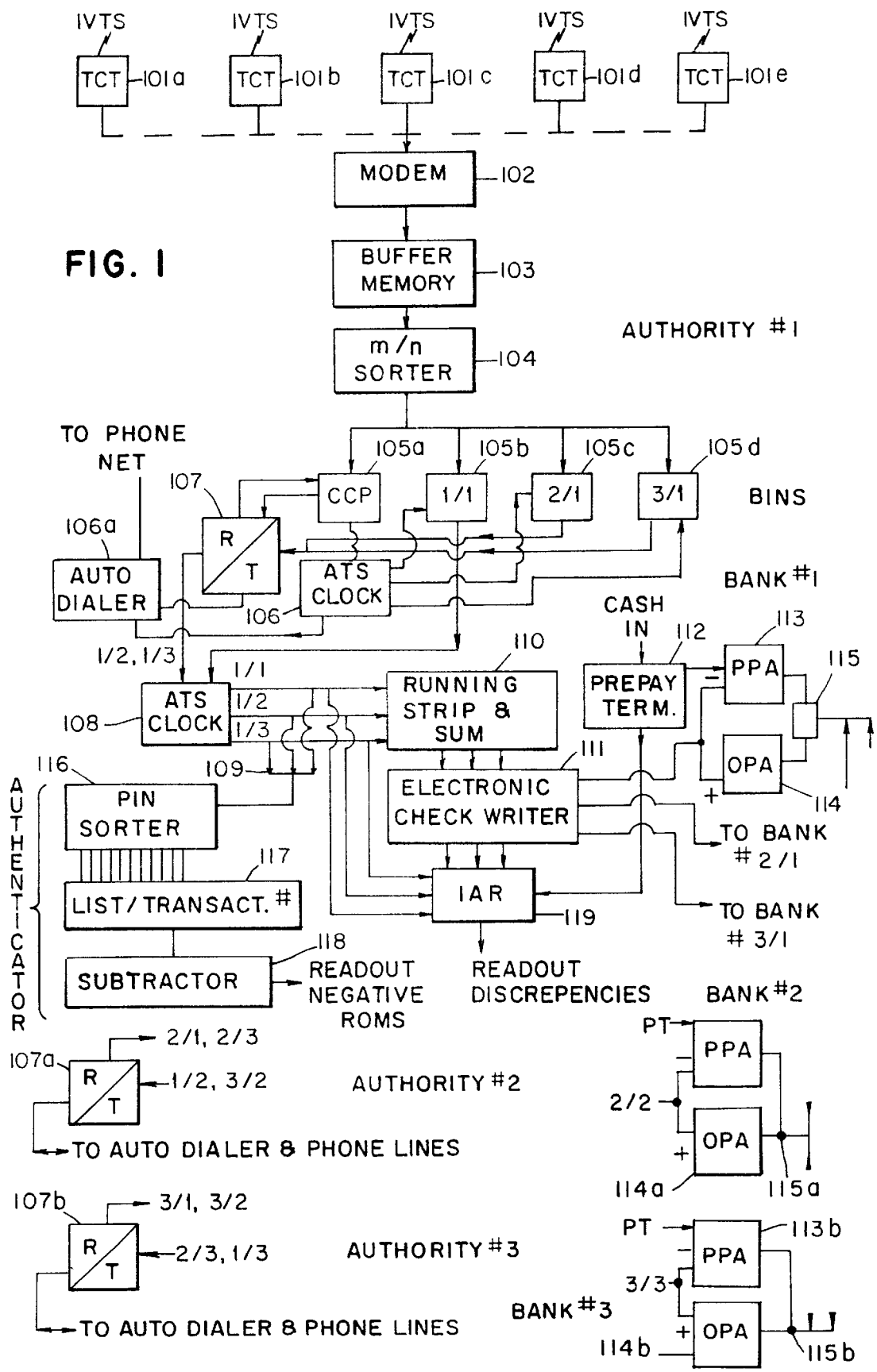
FIG. 1 illustrates, in block diagram form, the elements that comprise a sample three Authority settlement system, or method, that includes transaction authentication and account reconciliation.

Referring to the drawings in detail, FIG. 1 illustrates a preferred embodiment of the inter Authority settlement system by means of its functional processes. The actual apparatus would be implemented by an assemblage of microprocessors and/or a suitably programmed computer. These functional processes would then be used as a basis for generating software defining algorithms. FIG. 1 shows read-write IVT, 100, establishing a momentary radio link with TCT 101 for the transfer of toll data. The data received from the IVT includes the owner's PIN, the prepaid Authority's IDN(m), and optionally a running balance and recycled transaction number. TCT 101 adds its Authority's IDN(n), its own IDN, optionally a calendar-clock number readout, the locally created m/n address, and toll amount. This data is combined with the IVT's data to form a Toll Transaction Message or TTM. The simplest read-only IVT would have a TTM that is comprised of the m/n, PIN, and toll amount.

Each TCT accumulates its TTMs in a buffer memory and periodically sends the stored TTM's to its Authority's processing center where they are received thru modem 102 and temporarily stored in buffer memory 103 which feeds m/n sorter 104.

Sorter 104 feeds TTMs with like m/n addresses into designated storage bins 105a through 105d which illustrates a three Authority system with credit handling capability. Each bin has a m/n assigned to it. Those bins with non local m/n addresses have their data batches periodically transferred to receive/transmit, R/T, terminal 107 at times determined by assigned-time, AT, switch 106. This switch connects each bin to the communications interface during time intervals assigned for each m/n data transfer. Active bins might have one daily time slot, while less active bins would have data transferred every other day or so. R/T terminal 107 includes the receive (R) interface and the transmit (T) interface into the communications medium. That medium might be a telephone network or a Multiple Access satellite link. In the case of a telephone network, each Authority to which bin-data is addressed is automatically dialed during its assigned time slot on command from AT switch 106.

As each bin's data is transmitted to its designated Authority, AT switch 108 is synchronously switched to specific buslines during each time slot. This is done so like-m addressed batches are switched to n assigned buslines. In the three Authority system example, Authority #1 receives data out of bin 1/2 from Authority #2 and out of bin 1/3 from Authority #3 which switch 108 assigns each to an n designated busline. Authority #1 transmits its data from bin 2/1 to Authority #2 and from bin 3/1 to Authority #3. Data from bin 1/1 is directly transferred to its local 1/1 busline as shown. (If there were 100 participating Authorities there would be 100 buslines and 100 data bins.)

The 1/1, 1/2, 1/3 buslines emerging from assigned time switch 108 feeds into 3-to-1 line combiner 109 which directs all received TTMs into PIN sorter 116; running sum processer 110; and IAR processer 119.

PIN sorter 116 begins the transaction authentication process by sorting the data stream fed to it into like-PIN batches. The PIN sequence for each PIN batch is reordered in list/transaction-number processer 117 so that the transaction numbers are listed in ascending order, for example. The TTM at this point is comprised of only a calendar-clock number with PIN and TCT-IDN tags, the m/n and toll amount having been stripped. The calendar-clock numbers for each PIN are fed into running subtractor 118 where the difference between consecutive numbers is taken. PINs and TCT-IDNs associated with negative differences are fed into an alert file which can be shared with other Authorities to help confirm invalid transactions. Each Authority's PIN sorter sees only PINs that have prepaid accounts with it, hence the Authority gets a surveillance window onto the greater system pinpointing faulty transactions that impact only its cash flow.

Each busline's TTMs are fed into strippers & summers, 110, dedicated to that busline where all the TTM information except the toll amount is stripped away. The toll amounts are fed into the running sum section of 110 from which a running sum total for each busline accumulates and is periodically transferred to electronic cheque writer, ECW, 111, which consists of a a electronic checkwriter dedicated to each busline. Each checkwriter is programmed so its check will debit the prepaid Authority account, ie. PPA 113, ascribed to the busline and will credit the operating account, ie. OPA 114, of that collecting Authority, by the amount read out of running sum processer 110 of that busline. ECW 111 also includes a protocol code to access the bank, or banks.

An illustrative electronic check transfer process might begin with an Authority dialing its bank and directing it to dial back. Once this sequence is complete, the funds transfer process begins with the reading out of an entry code followed by the local prepaid account number to be debited. This would be followed by reading out from a programmable-read-only-memory the credited bank's ID and the credited Authority's account number which has been assigned to that busline, followed by the running sum that exists on the assigned busline at that moment. After the running sum is transferred it is reset to zero.

The funds transfer process could also be semi automated with paper cheques actually printed and delivered to the credited authority. This semi automated procedure would put a human directly in the loop. Other points in the IASS process that could be semi automated as a fail safe precaution, is 1) to have every TCT's transaction recorded on a floppy disc and if necessary hand delivered to the local Authority where the disc is read out into sorter 104, and 2) to have the output from m/n bins 105b and 105c recorded on floppy discs and if necessary delivered to their addressed Authorities where each would be read into its addressed bus line. These semi automated backups also prevent a system failure from permanently losing track of funds.

Optional Individual Account Reconciliator, IAR, 119 receives data from all bus lines as well as from all the ECWs. The IAR has a line for each prepaid account that is held by the prepaid Authority. Each line contains a running difference between the prepaid amount and the running sum of the m/n transactions for each account which, for Authority #1, would include the 1/1, 1/2, 1/3 transactions, to which is compared the current balance read in from each of its read-write IVTs during any transaction tagged with the local Authority's "m".

The difference between the prepaid column and the sum of each m/n column establishes an updated prepaid account net which is substituted for the old prepaid net. Any new prepaid cash is added to this updated net. If the comparison between the current IVT balance and the net of prepaid and m/n transactions is not within acceptable limits, that IVT is placed on watch for further discrepancies.

The sum total of each m/n column in IAR 116 should equal the inter bank transfers. If there is a correspondence, those inter bank transactions are confirmed. If the sum of the current prepaid balance column checks against the Authority's prepaid bank balance, then the prepaid local bank transactions are confirmed.

Prepaid cash or its equivalent is inserted into Prepay Terminal 112. The prepaid amount is transferred to the payer's IVT, to the prepaid account, PPA 113, of the local authority, and finally to the IVT's line in IAR 116. Prepay terminal 112 might be located on the local authority's toll plazas, on bank premises, etc.

FIG. 1 leaves out the processing detail for Authority #2 and #3 that duplicates that shown for Authority #1, and partially sketches in buslines emanating out of and into communication's terminals 107a and 107b, and feeding bank account blocks 113 and 114.

This automated settlement system can integrate credit card transactions by assigning an "m/n" address code to credit card transactions which batches credit card TTMs, or CC-TTMs, in bin 105a. Within bin 105a the various credit card company's transactions are sorted, and during an assigned time slot, AT clock 105 actuates a dialup of each credit card company, and transmission of its CC-TTMs. A CC-TTM includes the customer's credit card-PIN, the credit card company's identification code, and the toll amount. A running record of each credit card company's TTMs is kept by the collecting Authority to confirm payment.

Figure 2:
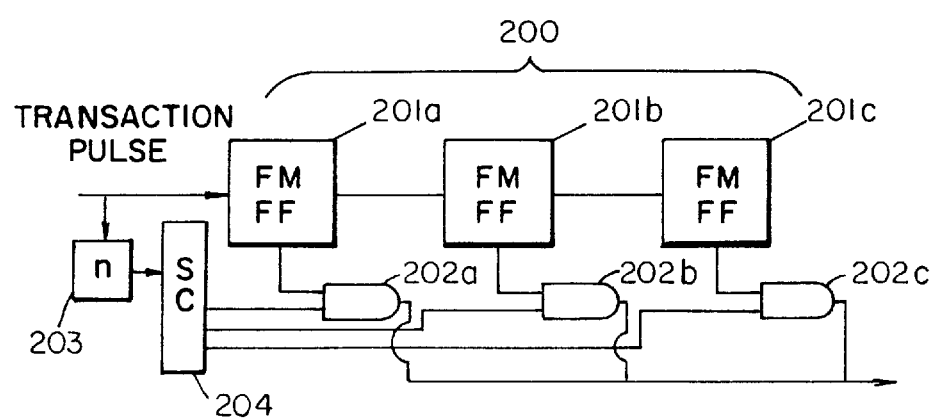
FIG. 2 illustrates a flash memory counter that can be inserted into each IVT to support transaction authentication.

FIG. 2 indicates a preferred transaction sequence numbering method. In this example a 3 flip flop counter is used. Flip flops 201a, 201b, and 201c are connected in tandem. These flip flops include flash memory elements that retain the count information even when all voltage is removed. The first flip flop, 201a, is driven by a signal pulse originating from the TCT. This is followed by a signal that actuates step counter 204 which reads out the binary count stored in counter 200 through "and" gates 203a, 203b, and 203c, creating a transaction number in binary form. Because this binary number automatically recycles after a full count of 111, a method is needed to preserve the transaction sequential order as the count moves from binary 111 to 000. This is realized by reading out and clearing stored bytes in any memory channel of PIN sorter 116 whenever its transaction number reaches binary 111.

I claim:

1. A method for automating inter Authority settlements between a plurality of autonomous Authorities employing debited electronic toll paying, without a central intervening third party, is comprised of the steps of:

reading out by a Toll Collecting Terminal, or TCT, from each passing In-Vehicle-Terminal, or IVT, a Personal Identification Number, or PIN, and a Prepaid Authority Identification Number, or PPA-IDN;

combining said IVT supplied numbers with the collecting Authority's Identification Number and toll amount supplied by the TCT to form a toll transaction;

assigning to each toll transaction an m/n address which designates the Authority to whom funds have been prepaid by m, and the Authority to whom the toll is being paid by n, said m/n address helps direct data to its m/n designated storage bin and forms a toll transaction message, or TTM, which at a minimum consists of the m/n address, PIN, and toll amount;

reading out like-m/n batched TTMs from each said data storage bin during preassigned time slots;

directing the resulting TTM batches to a communications interface where TTM batches are transmitted to the designated Authorities during said assigned time slots;

receiving TTM batches from other Authorities and feeding said TTM batches into a second, synchronized assigned-time switch which directs the appropriate m addressed batch from each Authority onto the n assigned busline, based on its time of arrival;

extracting toll amounts from each TTM and processing them into running sums for each busline, with each busline's running sum being periodically fed into a busline-assigned electronic check writer, ECW, which addresses that busline's running sum so it will credit and debit that busline's assigned bank accounts, then reset said running sum to zero; and using the banking system's Electronic Funds Transfer System, EFTS, to complete the inter-bank fund transfers as directed by said ECW.

2. Same as claimed in claim 1 but including a method that integrates the processing of electronic credit card transactions, which is comprised of the steps of;

assigning a special m/n data bin for all electronic credit card transactions, in which like credit card company transactions are batched and periodically sent to each credit card company along with the collecting Authority's IDN so credit/card company can settle its accounts in the usual manner.

3. A method for automating inter Authority settlements as claimed in claim 1, that also gives individual Authorities oversight onto all transactions in the greater system that affects their own cash flow, is comprised of the steps of;

feeding prepaid cash or its equivalent into prepay terminals with that amount credited to both the IVT's running balance and to a PIN line within an account reconciliation processer, said PIN line being comprised of said prepaid amounts, a running sum of transactions related to that PIN, and a calculated running balance;

comparing each PIN line's running balance to its corresponding IVT's running balance, with any discrepancy causing that PIN to be flagged for further checking; and summing the m/n columns to verify bank transactions.

4. A cross-checking anti-fraud system that provides each autonomous Authority with comprehensive but non-intrusive oversight onto operations of a multi-Authority settlement system, pinpointing fraudulent or inappropriate operations affecting the individual Authority's cash flow, is comprised of:

means for correlating individual account reconciliation and transaction authentication discrepancy data for fraudulent activity; and means for sending results of said correlations to those Authorities or TCTs where suspect activity have been localized, requesting verification and/or corrective action.

5. A method for giving each autonomous Authority non-intrusive surveillance onto widely dispersed, multi-Authority IVT & TCT operations that directly affect its cash flow, is comprised of the steps of:

assigning a recycled sequential number to each toll transaction by the in-vehicle-terminal and then transmitting said number along with other IVT data to a toll collection terminal, TCT;

inserting by said TCT, the TCT's IDN, toll amount, a running calendar-clock number, and an m/n derived address, all together forming an expanded toll transaction message, or TTM;

sending said transaction messages from the TCT to the Authority's processing center where said m/n addressed messages are fed into an m/n sorter which sorts all like-m/n toll transaction messages into respective data storage bins;

transferring all said TTMs received from said data storage bins into a PIN sorter, where like-PINs are batched and reordered so their transaction numbers are in sequential order;

subtracting associated calendar-clock numbers taken from said reordered sequential TTMs and checking for out-of-sequence or negative differences; and listing the PINs and TCT-IDNs with out of sequence TTMs for special attention.

6. A system for automating settlements between a multiplicity of autonomous Authorities using electronic toll collection systems, which also gives each individual Authority oversight onto all transactions that involve their cash flow, without recourse to an intervening third party, is comprised of:

a means for storing prepaid Authority and personal identifying numbers in an IVT;

a stepped, recycled transaction number generater inserted in said IVT;

a means for communicating said IVT numbers to a TCT where said TCT's Authority identifying number and toll amount is inserted;

a calendar-clock number generator which inserts its running number, at the moment of toll payment, into a toll transaction message assembled at said TCT;

an m/n address generater that combines the collecting and prepaid Authority's identifying numbers into an address code which is included with said IVT and TCT information to form a complete toll transaction message, or TTM;

a means for bringing said TTMS from said TCTs to an Authority processing center;

a means for sorting TTMs into m/n designated data bins;

a first assigned-time-switch that reads out like-m/n batched TTMs from said bins during predetermined time slots;

an inter Authority communications medium for transmission of each m/n designated TTM-batch to its settlement destination;

a second assigned-time-switch, located at each settlement destination, synchronized with said first switch to direct received TTM batches with like-m's onto n-designated buslines;

a multiplicity of toll-extracting running-sum processors, one associated with each said busline, said processors accumulating toll amounts to be debited from the busline-designated prepaid Authority account and credited to the collecting Authority account;

a multiplicity of electronic check writers, one for each busline, with permanently stored prepaid and collecting Authority bank/account identification numbers specific to each busline, into each said checkwriter is transferred amounts read out of said busline's running sum processer;

means for said electronic check writers to access its bank's EFTS to authorize inter bank fund transfers for settlement;

an Authenticator which assembles like-PINs, organizes them so their transaction numbers are in an ascending or descending order, and detects out-of-sequence calendar-clock numbers for investigation;

prepayment terminals which credit prepaid amounts into a local prepaid account, into said IVT's running account, where applicable, and into an account reconciliator; and an account reconciliating processer which compares said IVT running accounts with its own calculated running accounts, flagging those PIN lines with discrepancies, and also confirms bank transfers.

* * * * *